United States Patent [19]

Arnoth

[11] Patent Number: 5,074,298
[45] Date of Patent: Dec. 24, 1991

[54] GAS FLOW CONTROL SYSTEM
[75] Inventor: Frank W. Arnoth, Glen Mills, Pa.
[73] Assignee: E. I. du Pont de Nemours and Company, Wilmington, Del.
[21] Appl. No.: 402,169
[22] Filed: Sep. 1, 1989
[51] Int. Cl.$^5$ ............................................. A61M 16/00
[52] U.S. Cl. ........................... 128/204.18; 128/204.26; 128/205.24
[58] Field of Search .................. 128/202.26, 204.18, 128/204.26, 205.24

[56] References Cited
U.S. PATENT DOCUMENTS

| | | | |
|---|---|---|---|
| 3,390,676 | 7/1968 | Warncke et al. | 128/142.2 |
| 4,273,120 | 6/1981 | Oswell | 128/204.26 |
| 4,409,978 | 10/1983 | Bartos | 128/205.12 |
| 4,449,524 | 5/1984 | Gray | 128/204.26 |
| 4498,471 | 2/1985 | Kranz et al. | 128/204.26 |
| 4,510,930 | 4/1985 | Garcia | 128/205.24 |
| 4,800,923 | 1/1989 | Bartos | 137/613 |

Primary Examiner—Edgar S. Burr
Assistant Examiner—Aaron J. Lewis
Attorney, Agent, or Firm—Donald W. Huntley

[57] ABSTRACT

A compact, light weight, gas flow control system for fluid communication with a source of breathable gas consisting of pressure reducing and regulating means, means to initiate gas flow to a breathing bag, means to rapidly inflate the breathing bag, and means to sense breathing bag deflation and initiate re-inflation.

12 Claims, 6 Drawing Sheets

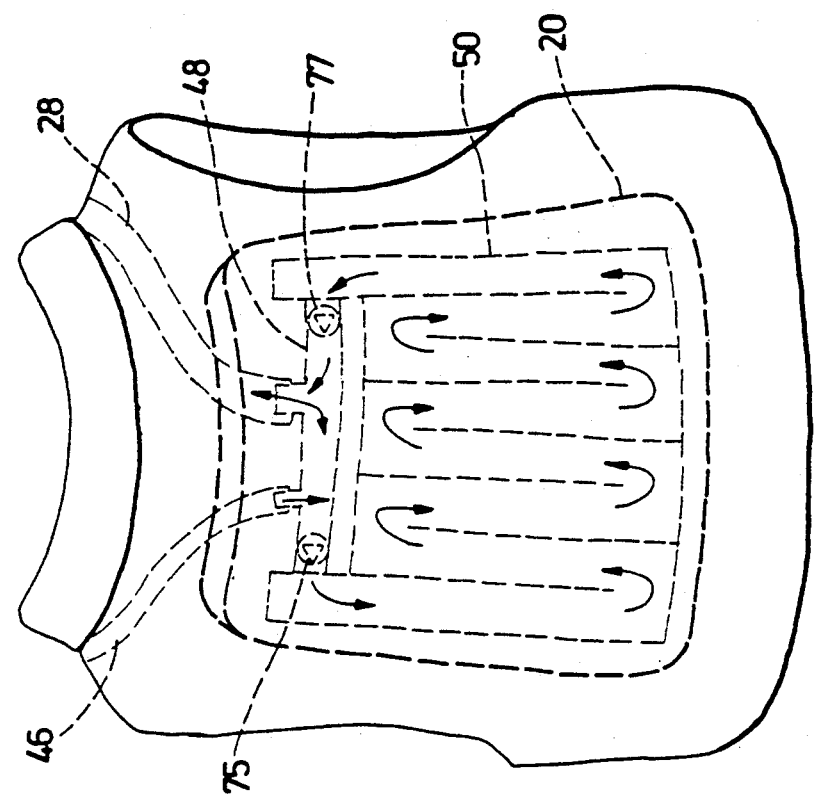
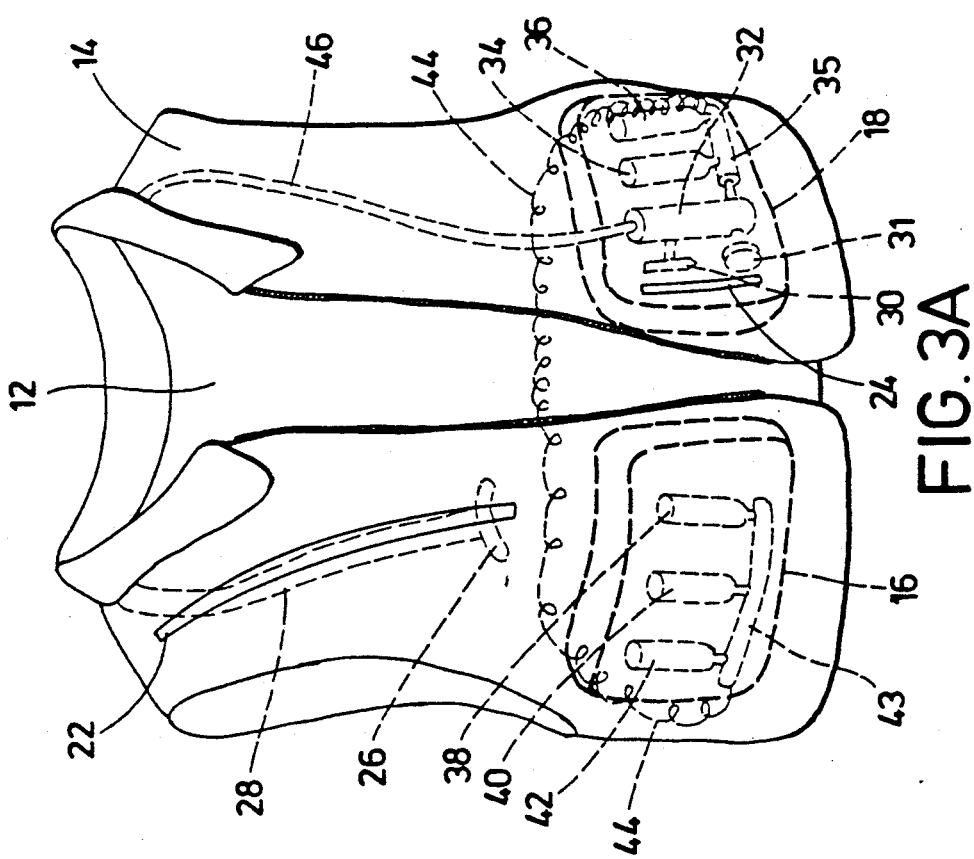
FIG. 3A
FIG. 3B

GAS FLOW CONTROL SYSTEM

BACKGROUND OF THE INVENTION

A variety of closed circuit breathing devices has previously been developed for use in a variety of applications, including hazardous work areas such as deep shaft mines. These devices are known as self-contained self-rescuer (SCSR) units. They typically provide an oxygen supply for breathing for up to one hour to give a miner time to escape conditions where there are toxic fumes present in the mine.

In previously available SCSR units, the need for extended service was balanced with portability. The desired one hour of breathable air has been provided with compressed oxygen or air supplies or oxygen generation systems, generally in combination with a carbon dioxide absorbent. Such systems often have the components included in canisters or tanks. High pressure tanks, in turn, require heavy pressure regulators to step down the high pressure of the compressed gas to the low pressure required for breathing bag inflation. Moreover, previous regulator systems relied on manual operation for adjustment of the flow of gas from the pressure tanks to the user.

In addition to the problem of overall bulk and weight of previously available regulator systems, the efficiency of known regulators did not maximize the use of available breathable gas.

SUMMARY OF THE INVENTION

The instant invention provides a gas flow control system for a closed circuit breathing apparatus which combines reducing, regulating, initiating and demand functions in a compact, lightweight apparatus which maximizes use of available breathable gas and minimizes user fatigue.

Specifically, the present invention provides a gas flow control system which comprises:

(a) a port for supply of pressurized gas;
(b) a multiple-stage pressure reducing means in fluid communication with the supply port;
(c) a pressure regulating means in fluid communication with the reducing means;
(d) means to initiate gas flow from the regulator means to a flow restricting means and to an exit port, and from the regulator means to a high flow demand means and a flow determined timing means;
(e) sensing means in fluid communication with the exit port to detect low pressure at the exit port and thereafter cause the high flow demand means and timing means to provide high flow for a predetermined time.

The present invention further provides a method of operating a closed circuit breathing device comprising a pressurized source of breathable gas, a $CO_2$ absorption means, means for releasing the breathable gas through a breathing bag at breathing cavity of a user, and means for circulating the breathable gas between the user and the $CO_2$ absorption means, which method comprises:

(a) initially filling the breathing bag with a breathable gas by causing flow of the gas for a predetermined time from the pressurized source;
(b) deflating the bag as the breathable gas is consumed;
(c) sensing the deflation of the bag with means to sense the gas pressure of the bag; and
(d) re-inflating the breathing bag with breathable gas by causing flow of the gas for a predetermined time from the pressurized source.

BRIEF DESCRIPTION OF THE DRAWINGS

FIGS. 3A & B are front and rear views of a vest embodying an apparatus of the present invention.

DETAILED DESCRIPTION OF THE INVENTION

The present invention relates to an oxygen or gas flow control system for fluid communication with a source of breathable gas consisting of pressure reducing and regulating means, means to initiate gas flow to the breathing bag, means to rapidly inflate a breathing bag, and means to sense breathing bag deflation and initiate re-inflation.

Figure 1:
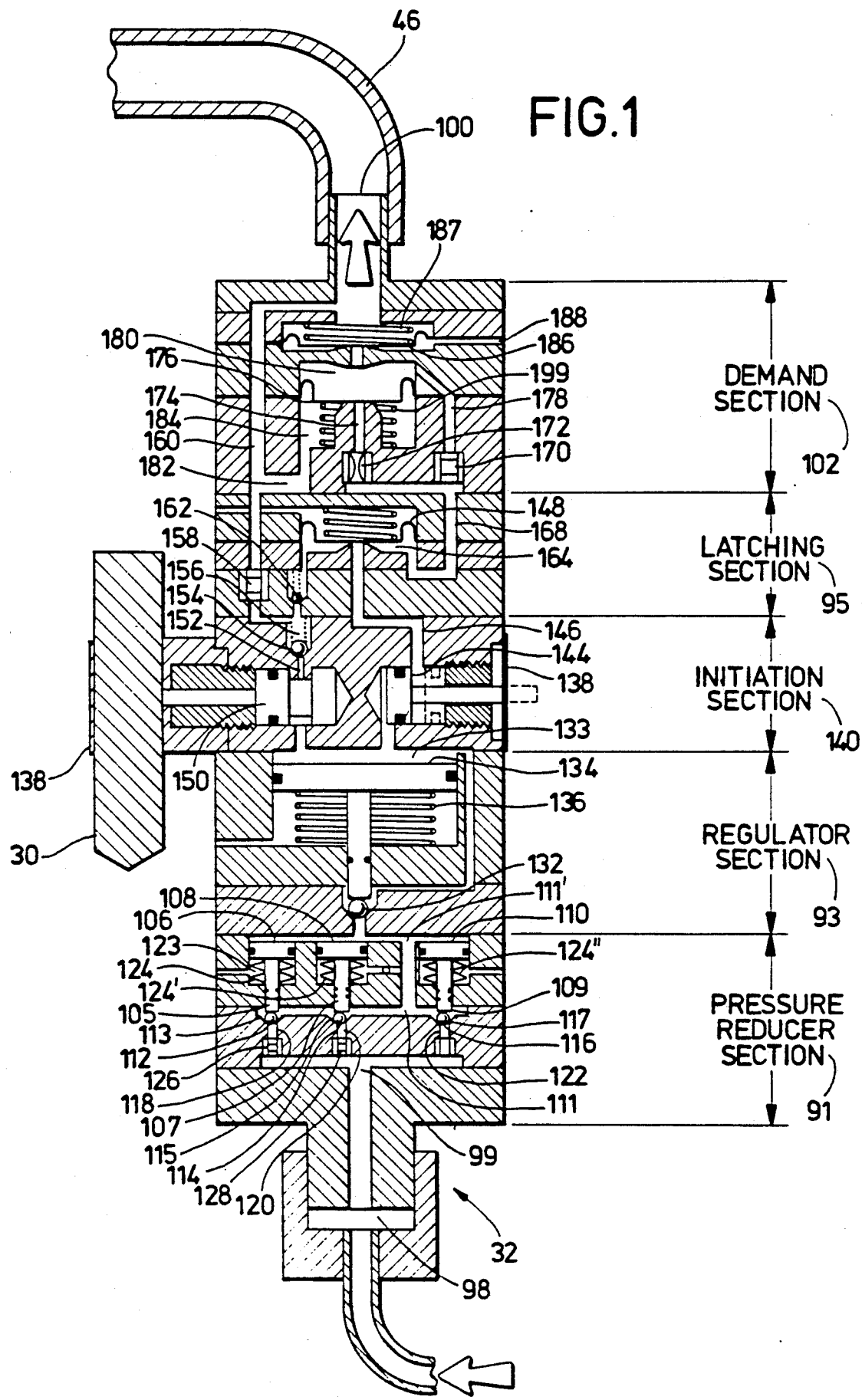
FIG. 1 is a cross-sectional diagrammatic view of a gas flow control system of the present invention.

The present invention will be more fully understood by reference to the Figures, in which FIG. 1 is a cross-sectional diagrammatic view of an apparatus of the invention. In that Figure, high pressure oxygen enters at 98 and low pressure oxygen exits at 100.

There are five different sections to the system which collectively reduce the oxygen pressure from 5000–8000 psi to a final regulated pressure of about 30 psi and initiate oxygen flow from a shutoff condition and provide a constant flow rate of about 1.5 slpm to sustain a minimum level of oxygen supply. In addition, the valve provides a demand flow of 30 slpm to rapidly inflate the breathing bag for the first time and then replace the oxygen consumed and reinflate the breathing bag when it deflates during consumption (pressure in the breathing circuit drops to less than about from 2 to 5 inches of water vacuum). This is provided by latching section 95 and demand section 102.

In FIG. 1, the pressure reducer 91 is fed a compressed gas from inlet 98 to cavity 99. The preferred reducer has three reduction pistons, 106, 108, and 110 and corresponding piston rods 105, 107, and 109 arranged around a central axis (shown in-line in the figure) and having a common pressure chamber 111/111'. Each piston rod holds a ball (112, 114, & 116) against a conical seat (113, 115, & 117) to restrict flow through orifices 118, 120, and 122. The ball should be resistant to oxidation and compressive failure, and according can be prepared from materials such as tungsten carbide or saphire. The pistons 106, 108, and 110 each have different diameters, but the same set of spring restraint washers 124, 124' & 124" and the same diameter piston rods (and hence rod area) can be used for simplification of assembly. Thus, the displacement is a function of the piston areas, with the larger diameter, higher area piston 110 holding ball 116 against the valve seat 117 at a lower pressure. The springs are in an intermediate volume, such as 123, vented to atmosphere. As the pressure in chamber 111/111' drops due to high flow demand downstream or a decrease in cylinder pressure during use, small piston 106 is displaced by springs 124 to permit flow past ball 112. With a further reduction in pressure in chamber 111/111', piston 108 is displaced by springs 124', to permit flow past ball 114 and finally piston 110 is displaced by springs 124" to permit flow past ball 116. This permits the desired flow to be maintained under high demand and decreasing supply conditions. The initial pressure step-down is across porous metal restrictors 126 and 128, and balls 112, 114, and 116; the next pressure step-down is across ball 132 which is restrained by pressure in chamber 133 acting on piston 134 which is urged open by spring 136. At equilibrium with the oxygen system turned off, there is no flow past balls 112, 114, 116, and 132, and the pressure in chamber 133 is about from 30 to 50 psi with a 5000 psi cylinder pressure.

The pressure reduction system distributes the energy generated in the reduction of the pressure from the initial source of breathable gas to an intermediate pressure which can be controlled by the regulator.

In the particular embodiment shown in the Figures, the oxygen system is turned on by first removing a restraint strap 138 which encircles the initiation section 140 which includes initiation valve handle 30, and then rotating handle 30 about 180 degrees. Removal of the strap allows piston 144 to move to the right which allows pressurized oxygen from chamber 133 to enter passage 146 which is sealed by diaphragm 148. Rotation of handle 30 causes cam surface 150 to move shaft 152 to displace ball 154. This permits pressurized oxygen from chamber 133 to flow through passage 156. From 156 the oxygen can go through restrictor 158 to passage 160 and out exit port 100. Restrictor 158 sets the minimum constant flow level of 1.5 standard liters per minute (slpm). From 156, the oxygen also flows past check valve 162 into chamber 164 where the pressure acts on a large area of diaphragm 148 to lift it from sealing passage 146. From chamber 164, oxygen flows through passage 168 to flow restrictors 170 and 172. Through restrictor 172, oxygen flows through passage 174 which is sealed by diaphragm 176. Through restrictor 170, oxygen flows through passage 178 to chamber 180 to provide sealing pressure for diaphragm 176.

When the system is initially turned on, however, there is only atmospheric pressure in chamber 180 and therefore diaphragm 176 is held open by spring 199. This permits flow to proceed through restrictor 172 and passage 174 into passage 182, and on to port 100. The flow through restrictor 172 is approximately 30 liters/minute, which rapidly inflates the breathing bag which is in fluid communication with port 100. Meanwhile oxygen is slowly flowing through restrictor 170 and through passage 178 to chamber 180 which is sealed by diaphragm 186, which, in turn is held in place by spring 187. This causes pressure in chamber 180 to gradually increase so that after about two seconds, the pressure above diaphragm 176 exceeds the pressure below it in chamber 184, and the spring force, so the diaphragm moves down and seals passage 174. At this point, the breathing bag is about ⅔ full.

If the user of the bag is somewhat active, the oxygen can be removed at a rate slightly greater than the rate which it is supplied through passage 160 from restrictor 158. When this is the case, the bag eventually deflates until on one breath, a slightly negative pressure occurs at exit port 100. At less than about −2 inches water pressure at 100, diaphragm 186 moves upward against spring 187 to open. This lets the pressure in chamber 180 rapidly vent to atmosphere through passage 188. When this occurs, diaphragm 176 again unseals passage 174 and a high flow of oxygen is available to flow through exit port 100 raising the pressure there so diaphragm 186 again closes chamber 180. Pressure again starts to rise in 180 by flow through restrictor 170 until diaphragm 176 is again moved to close passage 174 after the bag is again about ⅔ full. The above cycle of events are repeated while the user continues using the breathing apparatus and until the oxygen supply is exhausted.

Under low oxygen requirements by the user, the user may choose to turn off the constant flow of oxygen to prevent overinflating the bag. This is done by rotating handle 30 back 180 degrees to let ball 154 close flow to passage 156. Oxygen flow is still available through passages 146 and 168 to the demand valve passages which will provide oxygen periodically as described above to inflate the bag after a negative pressure excursion indicates bag deflation. If the user no longer needs to use the breathing apparatus, the demand oxygen supply can also be turned off by reapplying strap 138 to move piston 144 to the left thereby sealing flow from chamber 133.

Figure 2:
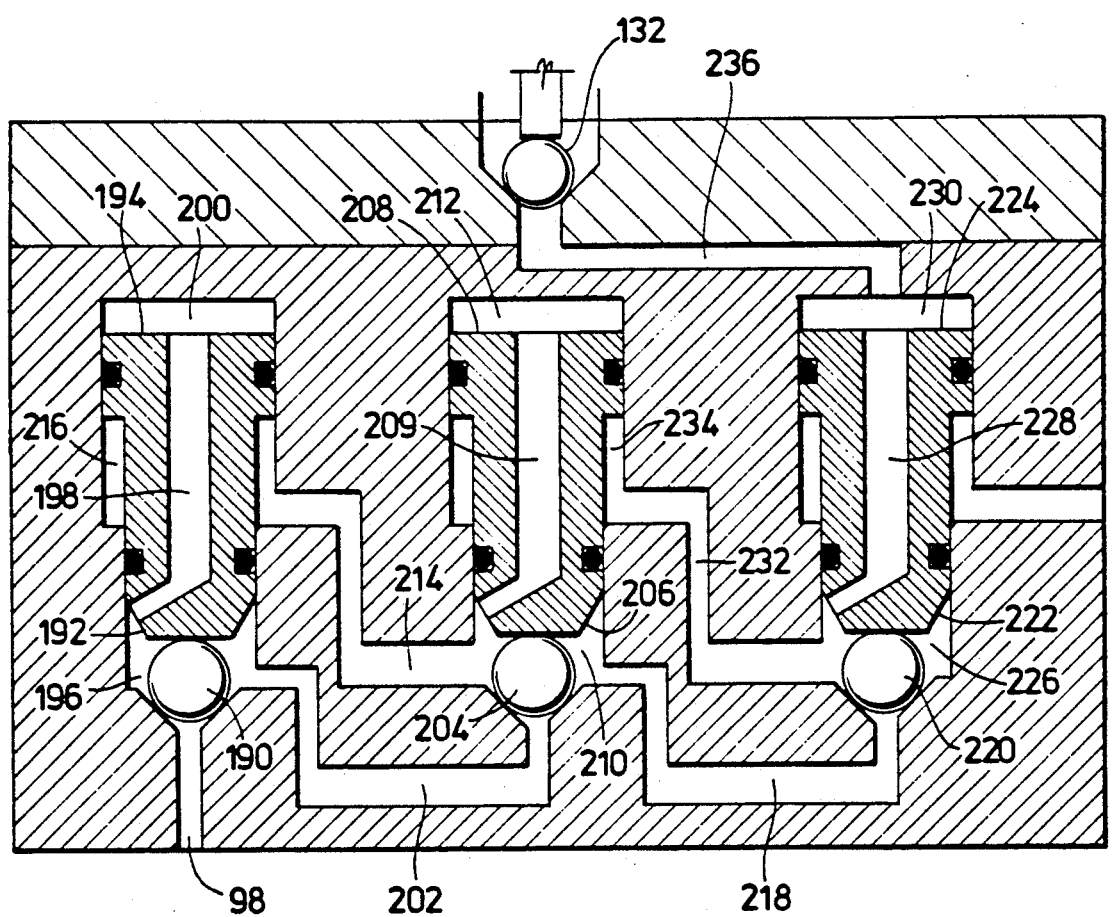
FIG. 2 is a cross-sectional diagrammatic view of an alternative pressure regulator which can be used in the apparatus of FIG. 1.

FIG. 2 shows an alternate pressure reducer section for the control valve 32. This embodiment reduces the number of different parts required and the machining costs to make them. In this design, the pressure is reduced by passing the gas through a set of valves in series, with each valve taking a smaller more manageable drop, and all springs are eliminated. In the alternative design of FIG. 2, the difference in area between the piston and piston rod is reduced and the space under the first reduction piton is vented to the gas which has passed through the second reduction piston instead of to the atmosphere, and likewise, the second reduction piston is vented to the gas that has passed through the third reduction piston. This results in a pressure drop across the "O-rings" which does not require backup rings. This higher pressure under the piston acts like a spring to force the piston upwards, so no separate spring is required.

The alternate design of FIG. 2 will be further illustrated using the theoretical pressures in the system for one set of conditions for a 1.5 slpm flow. Supply pressure at 5000 psi enters at 98 and acts on ball 190, forcing it upward, thereby displacing piston rod 192 and first reduction piston 194. In flowing past ball 190, the pressure drops to 3426 psi in chamber 196. From chamber 196, the oxygen at 3426 psi flows through passage 198 in the first piston rod/piston to chamber 200 above piston 194; and at the same time it flows through passage 202 to ball 204. The pressurized oxygen forces ball 204 upwards thereby displacing piston rod 206 and second reduction piston 208, and drops to 2091 psi in chamber 210. From 210, the oxygen at 2091 psi flows through passage 209 in the second piston rod/piston to chamber 212 above piston 208. The oxygen at 2091 psi also flows through passage 214 to chamber 216 below first piston 194, and flows through passage 218 to ball 220. The pressurized oxygen acting on ball 220 forces it upward thereby displacing piston rod 222 and third reduction piston 224. In flowing past ball 220, the pressure drops to 959 psi in chamber 226. From chamber 226, the oxygen at 959 psi flows through passage 228 in the third piston rod/piston to chamber 230 above piston 224. The oxygen at 959 psi also flows through passage 232 to chamber 234 below second piston 208. From chamber 230 above third piston 224, the oxygen flows through passage 236 to the pressure regulator ball 132 in the pressure regulator section 93. For the sample conditions mentioned, there is a constant flow through the pressure reducer section and all pistons are up slightly allowing flow past balls 190, 204, and 220. As the flow demands decrease, the pressure above the pistons gradually increases and the pistons push the balls into their seats.

The gas flow control system of the present invention, is preferably used in conjunction with a breathing bag which, by its unique construction, contributes to the desirable combination of light weight, extended performance life and portability, of the overall system. Preferably the apparatus also has the source of breathable gas disposed in a plurality of containers connected by a flexible manifold.

The present apparatus can be configured to suit the needs of the particular application, including, for example, all of the operating elements being in a back pack. However, the central features of the present invention permit the configuration of the apparatus as a vest or other garment which can be conveniently worn by the user in the routine course of work, and such a configuration is particularly preferred.

The gas containers previously used in SCSR units typically comprised one or two pressurized bottles. These resulted in substantial bulk which prevented wearing of the resulting apparatus under normal working conditions. In accordance with a preferred embodiment of the present invention, the breathable gas is distributed among a plurality of containers, connected by a flexible manifold. In general, four or more containers are preferred for even distribution of the weight and bulk of the containers around the wearer. The flexible connection can be provided by coiled capillary tubing which has a flexible support within the coil to prevent crushing during use.

FIG. 3 shows an apparatus of the invention in conjunction with a breathing apparatus in the form of a vest, with front view A and a back view B. In this embodiment, the vest is made up of three shells. An inner shell 12 is a lightweight breathable fabric comfortable next to the wearer's body. An outer shell 14 is a heavier weight protective covering for the components of the breathing apparatus. An intermediate shell (not shown) is fitted with fabric compartments, such as 16, 18, and 20, to support and contain the breathing system. In the outer shell are zipper openings, such as 22 and 24, that provide user access to the mouthpiece 26 and breathing tube 28 and the oxygen on/off lever 30 and gauge 31, respectively. The oxygen control valve 32 and two oxygen cylinders 34 and 36 on manifold 35 are located in the compartment 18, and three addition oxygen cylinders 38, 40, and 42 on manifold 43 are together in compartment 16. This distributes the bulk and weight of the oxygen supply system equally on either side of the vest.

A high pressure connecting tube 44 passing along the lower back of the vest connects the oxygen cylinder manifold 43 in compartment 16 to the oxygen cylinder manifold 35 in compartment 18. Low pressure supply tube 46 connects the oxygen valve 32 to the breathing bag manifold 48. Breathing tube 28 is also connected to manifold 48 which is part of breathing bag 50 located in compartment 20. The inner shell is sewn to the outer shell along the neck and front zippered edges and is detachably connected around the arm holes using Velcro hook and loop fastener. The intermediate shell is preferably detachably connected to the outer shell along the bottom back and front edges, the front zippered edges and the neck. This makes it easy to fabricate and clean the vest and place and replace breathing system components.

The gas flow control apparatus of the present invention is generally used in conjunction with a breathing bag which is in operative connection with the source of breathable gas. A preferred breathing bag has a plurality of collapsible channels and unidirectional flow directing means to control flow sequentially through the channels, and having a $CO_2$ absorption means disposed within the channels of the breathing bag.

Figure 4:
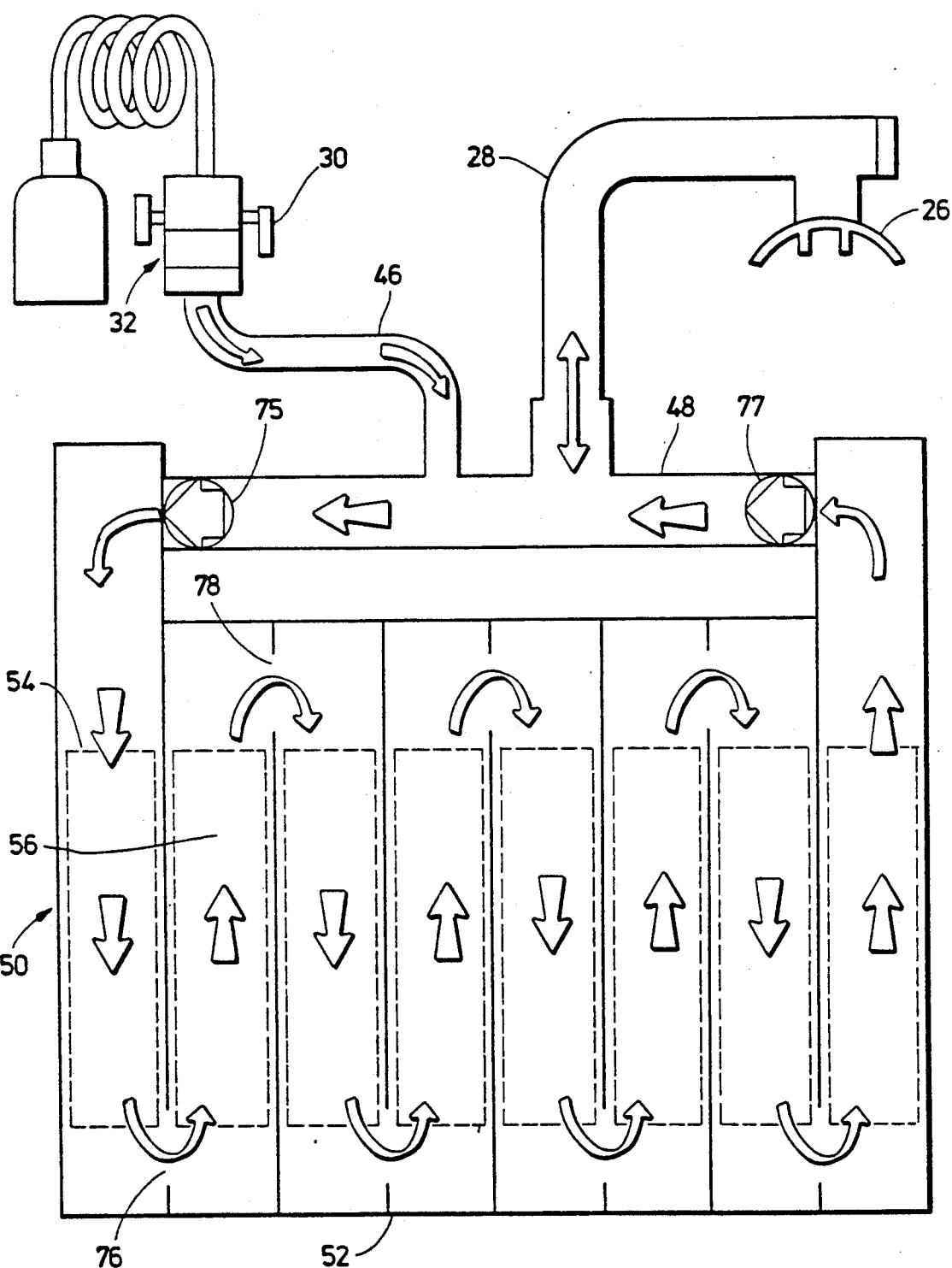
FIG. 4 is a cross-sectional schematic view of a representative breathing bag which can be used in conjunction with the apparatus of the present invention.

FIG. 4 is a cross-sectional schematic view of a representative breathing bag which can be used in conjunction with the present invention. As shown in that Figure, the breathing bag consists of manifold 48 and expandable/collapsible bag 52. Manifold 48 has connections for breathing tube 28 and supply tube 46 and includes unidirectional flow or check valves 75 and 77. Bag 52 is divided into 8 channels, such as 54 and 56. The channels are shown in greater detail in FIGS. 3A, 3B, and 3C. Within each channel are cells 58, 60, 62, and 64. Inner partitions 66, 68, and 70 cooperate with the outer walls of channel 56 to form the cells.

The partitions and channels can be made of a variety of polymeric films, and assembled, for example, by adhesive bonding or dielectric sealing. However, heat sealing has been found to be a particularly effective method of manufacture, and heat sealable films are accordingly preferred. Such films include, for example, low density polyethylene (LDPE), and a variety of polymeric laminates which have a heat sealable material on at least one outer surface.

Figures 5A, 5B, 5C:
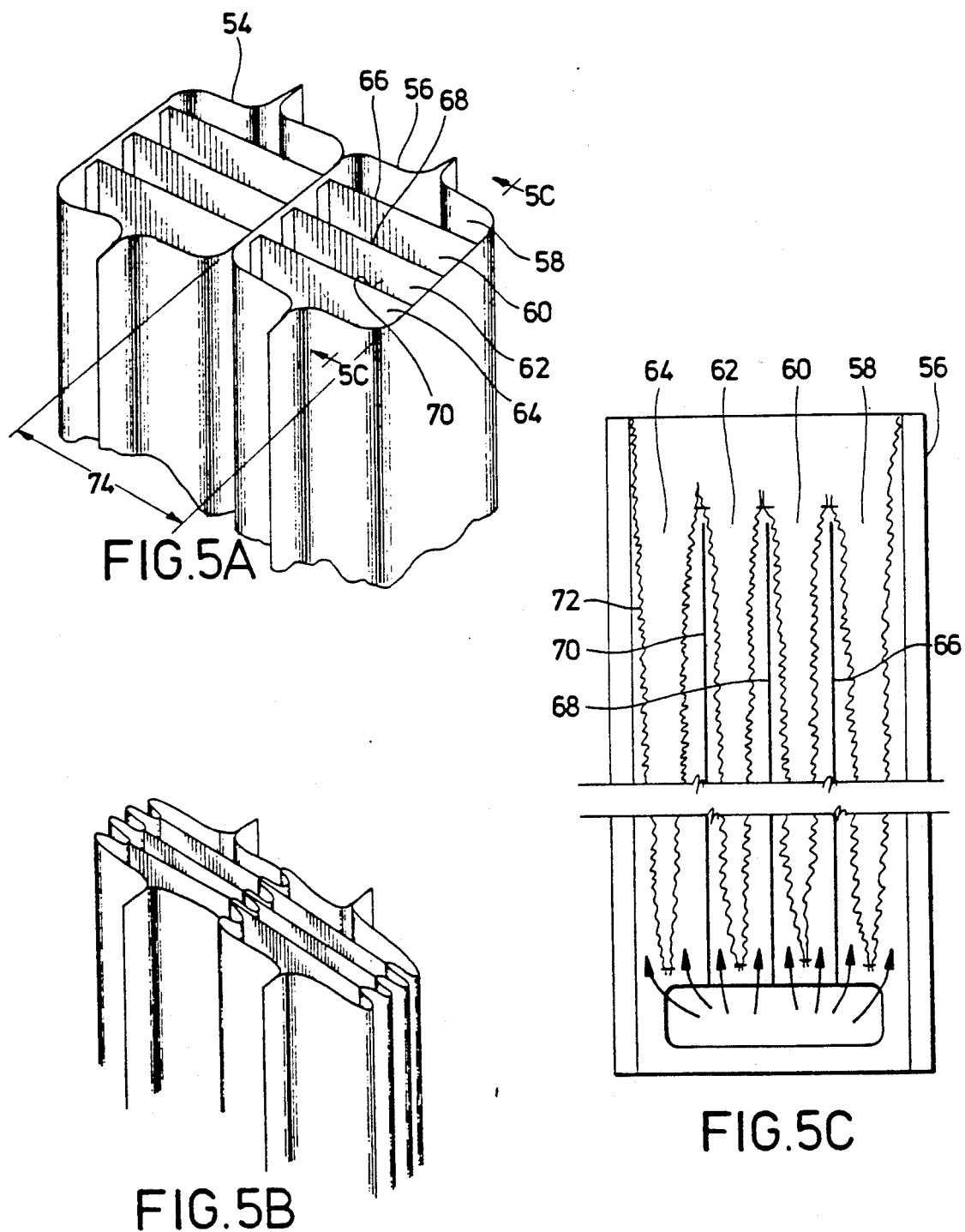
FIGS. 5 A, B, & C are perspective and cross-sectional views of a breathing bag which can be used in conjunction with the apparatus of the present invention.

The channels 54 and 56 are shown expanded in FIG. 5A and collapsed in FIG. 5B.

The $CO_2$ absorption means, or scrubber, is disposed within the channels of the breathing bag. It is preferably fitted inside the cells in the channel, and especially in each channel to maximize the exposure of gas to the absorption means. While a variety of $CO_2$ scrubbers can be used in the present apparatus, one that is particularly preferred is that consisting of lithium hydroxide and a fiber compounded and cast in a sheet, as more fully described in copending, coassigned patent application 07/228,059, filed May 20, 1988, which is hereby incorporated by reference. This $CO_2$ absorbent sheet is typically sewn into a covering of non-woven polypropylene in the form of long, narrow rectangular strips or belts. In FIG. 3C one of these belts 72 is folded over partitions 66, 68, and 70 in a serpentine fashion. In the alternative, the belts can use a seam sewn at the fold to retain the desired shape and position of the belt. The belts are the same width as the width, such as 74, of channel 56. For clarity, the belts are not shown in FIGS. 5A and 5B. In operation, the user's breath passes over and preferably through $CO_2$ scrubber belt 72 as the exhaled gas goes through cells 58, 60, 62, and 64 of channel 56.

Between the channels are passages, such as 76 and 78. In FIG. 5C the user's breath goes from channel 54 through passage 76 to channel 56 and it passes up through cells 58, 60, 62, and 64 as shown by the arrows at the bottom of FIG. 5C. In this manner, the $CO_2$ absorbent is distributed substantially uniformly throughout the breathing bag. In the alternative, the $CO_2$ absorbent can be provided in packets of semipermeable membrane attached to the walls of the breathing bag.

Figure 6:
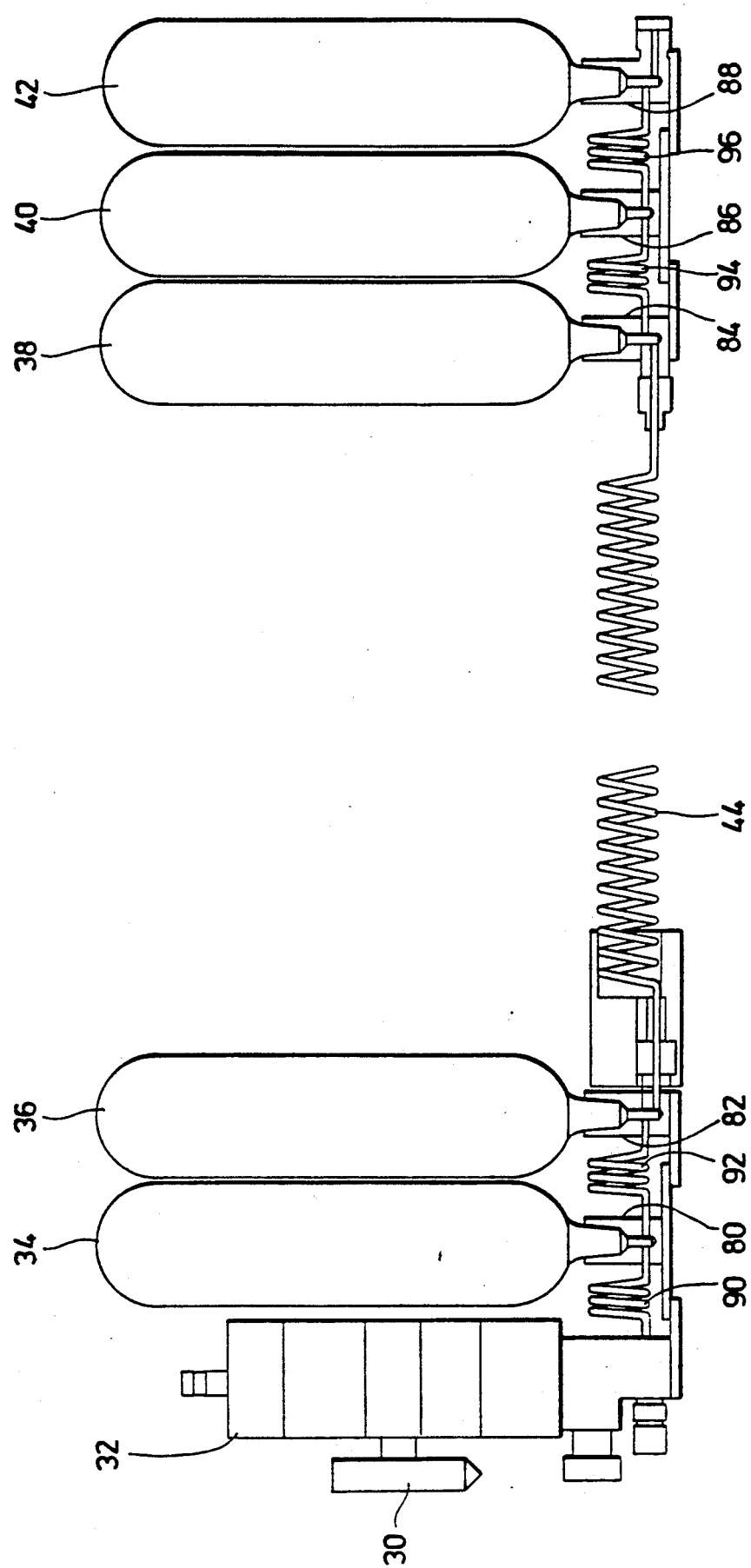
FIG. 6 is a front plane view of breathable gas containers, their connecting manifold, and the gas flow control system of the invention.

FIG. 6 shows the pressurized gas source in combination with the gas flow control system of the present invention. The gas source consists of five high pressure cylinders 34, 36, 38, 40, and 42 which are manifolded together via cylinder end fittings 80, 82, 84, 86, and 88 and high pressure coiled tubing segments 90, 92, 44, 94, and 96. The coiled tubing used to manifold the cylinders together prevents kinking, and adds to the flexibility and wearing comfort of the apparatus. The coiled tubing and pivotally connected end fittings permit the oxygen assembly to deflect and conform to the body of the user at the waist. The last segment of coiled tubing 90 connects the high pressure oxygen to the oxygen regulator 32.

The present gas flow control system provides other desirable features, in that it is compact, lightweight, and fits inside the profile of an apparatus of the invention configured as a vest. In addition, the constant flow can be turned off in low flow situations to save oxygen leakage from the system while the demand flow function remains available; the system operation is controlled from one valve handle avoiding confusion by the user in an emergency; and the user can easily draw oxygen from the inflated breathing bag without having to "pull" oxygen from the control valve, thereby minimizing user fatigue.

Features of this control system which are particularly beneficial are the multi-stage reducing valve and the combination of the reducing, regulating, initiating, and demand functions in a compact lightweight apparatus which is important to achieving the compact light weight characteristic of the entire system.

In operation of the SCSR, in an emergency condition in which poisonous gases are present, the user unzips zippers 22 and 24 and turns the system on by handle 30. The user next withdraws mouthpiece 26 and breathing hose 28, places the mouthpiece in his mouth and places a noseclamp on. Oxygen then flows from control valve 32 through supply line 46 into manifold 48 which can be immediately inhaled by the user via breathing tube 28 and can inflate bag 50. After 2-3 seconds, the oxygen control valve 32 shuts off the demand flow of oxygen and maintains a low constant flow, and the bag is at least ⅓ inflated. The user exhales and inflates the bag slightly and forces breath through unidirectional valve 75 and through channels, such as 54 and 56, and over the $CO_2$ absorber placed in the cells of each channel.

As the user inhales, the unidirectional valve 75 closes and 77 opens so now breath with $CO_2$ removed flows from bag 50 and down breath tube 28 to the user. The exhalation and inhalation cycles continue with oxygen being consumed by the user on each breath. When consumption of the oxygen is greater than the constant flow supply, this gradually causes the bag 50 to collapse so that during one inhalation, the pressure in the bag drops briefly below atmospheric. This pressure reduction is sensed by demand section 102 in oxygen control valve 32 so the valve responds and supplies a high flow of oxygen for 2-4 seconds to reinflate the bag. This process goes on until the oxygen supply runs out which takes 2 hours of vigorous user activity. This should be plenty of time for the user to get out of the poisonous gas environment.

An SCSR apparatus of the present invention can meet the requirements of NIOSH for a two-hour duration escape respirator for a 220 pound male. For an individual at rest, the preferred combination of components can provide up to 10 hours of breathable air.

I claim:
1. A gas flow control system which comprises:
   (a) a port for supply of pressurized gas;
   (b) a multiple-stage pressure reducing means in fluid communication with the supply port comprising:
      i. a plurality of pressure reducing ball and seat assemblies, each in fluid communication with the source of pressurized gas on the seat side of the assembly and in fluid communication with a common volume on the ball side;
      ii. a plurality of piston and piston rod assemblies, each with the piston rod in contact with one of the balls to urge the ball toward the seat, each piston rod end and piston end sealed from an intermediate volume which is vented to atmosphere, and each piston end in fluid communication with the common volume, the piston ends each having a different area which is larger than the rod area;
      iii. a spring placed between the rod end of each piston and an opposing wall of the intermediate volume which urges each piston and attached rod away from the ball seat;
      iv. flow restricting means in fluid communication between the common volume and the atmosphere to develop an elevated pressure in the common volume;
   whereby the difference in force applied to each piston and piston rod due to pressure in the common volume and at the source, results in the pistons moving away from the seat sequentially with the smaller area piston moving first as the supply and/or common volume pressure drops;
   (c) a pressure regulating means in fluid communication with the reducing means;
   (d) means to initiate gas flow from the regulator means to a flow restricting means and to an exit port, and from the regulator means to a high flow demand means and a flow determined timing means;
   (e) sensing means in fluid communication with the exit port to detect low pressure at the exit port and thereafter cause the high flow demand means and timing means to provide high flow for a predetermined time.

2. A gas flow control system of claim 1 in operative connection with a portable closed circuit breathing apparatus of the type comprising a pressurized source of breathable gas, a $CO_2$ absorption means, means for releasing the breathable gas to at least one breathing cavity of a user, and means for circulating the breathable gas between the user and the $CO_2$ absorption means.

3. A breathing device comprising a pressurized source of breathable gas, a $CO_2$ absorption means, means for releasing the breathable gas to at least one breathing cavity of a user, and means for circulating the breathable gas between the user and the $CO_2$ absorption means, and a gas flow control system of claim 1.

4. A gas flow control system of claim 1 wherein the pressure reducing means further comprises a porous metal restrictor positioned between the source of pressurized gas and at least one of the ball and seat assemblies.

5. A gas flow control system which comprises:
(a) a port for supply of pressurized gas;
(b) a multiple-stage pressure reducing means in fluid communication with the supply port comprising:
   i. a pressure confining housing;
   ii. a first pressure reducing ball and seat assemblies contained in the housing, in fluid communication with a source of pressurized gas on the seat side of the assembly and in fluid communication with a first reduction volume on the ball side;
   iii. a first piston and piston rod assembly contained in the housing, with the piston rod in contact with one of the ball to urge the ball toward the seat, the piston rod end and piston end sealed from a first intermediate volume, and the first piston end in fluid communication with the first reduction volume, the piston ends having an area which is larger than the rod area;
   iv. a second pressure reducing ball and seat assembly contained in the housing, in fluid communication with the first reduction volume on the seat side of the assembly and in fluid communication with a second reduction volume on the ball side, the second reduction volume in fluid communication with the first intermediate volume;
   v. a second piston and piston rod assembly contained in the housing, with the piston rod in contact with the second ball to urge the ball toward the seat, the piston rod end and piston end sealed from a second intermediate volume in fluid communication with the atmosphere, and the second piston end in fluid communication with the second reduction volume, the piston end having an area which is larger than the rod area; and
   vi. a flow restrictor in fluid communication with the second reduction volume;
(c) a pressure regulating means in fluid communication with the reducing means;
(d) means to initiate gas flow from the regulator means to a flow restricting means and to an exit port, and from the regulator means to a high flow demand means and a flow determined timing means;
(e) sensing means in fluid communication with the exit port to detect low pressure at the exit port and thereafter cause the high flow demand means and timing means to provide high flow for a predetermined time.

6. A gas flow control system of claim 5 in operative connection with a portable closed circuit breathing apparatus of the type comprising a pressurized source of breathable gas, a CO$_2$ absorption means, means for releasing the breathable gas to at least one breathing cavity of a user, and means for circulating the breathable gas between the user and the CO$_2$ absorption means.

7. A breathing device comprising a pressurized source of breathable gas, a CO$_2$ absorption means, means for releasing the breathable gas to at least one breathing cavity of a user, and means for circulating the breathable gas between the user and the CO$_2$ absorption means, and a gas flow control system of claim 5.

8. A gas flow control system of claim 5 wherein the pressure reducing means further comprises a porous metal restrictor positioned between the source of pressurized gas and at least one of the ball and seat assemblies.

9. A gas flow control system which comprises:
(a) a port for supply of pressurized gas;
(b) a multi-stage pressure reducing means in fluid communication with the supply port comprising:
   i. a pressure confining housing;
   ii. a first pressure reducing ball and seat assemblies contained in the housing, in fluid communication with a source of pressurized gas on the seat side of the assembly and in fluid communication with a first reduction volume on the ball side;
   iii. a first piston and piston rod assembly contained in the housing, with the piston rod in contact with the first ball to urge the ball toward the seat, the piston rod end and piston end sealed from a first intermediate volume, and the first piston end in fluid communication with the first reduction volume, the piston end having an area which is larger than the rod area;
   iv. a second pressure reducing ball and seat assembly contained in the housing, in fluid communication with the first reduction volume on the seat side of the assembly and in fluid communication with a second reduction volume on the ball side, the second reduction volume in fluid communication with the first intermediate volume;
   v. a second piston and piston rod assembly contained in the housing, with the piston rod in contact with the second ball to urge the ball toward the seat, the piston rod end and piston end sealed from a second intermediate volume, and the second piston end in fluid communication with the second reduction volume, the piston end having an area which is larger than the rod area;
   vi. a third pressure reducing ball and seat assembly contained in the housing, in fluid communication with these second reduction volume on the seat side of the assembly and in fluid communication with a third reduction volume on the ball side, the third reduction volume in fluid communication with the second intermediate volume;
   vii. a third piston and piston rod assembly contained in the housing, with the piston rod in contact with the third ball to urge the ball toward the seat, the piston rod end and piston end sealed from a third intermediate volume in fluid communication with the atmosphere, and the third piston end in fluid communication with the third reduction volume, the piston end having an area which is larger than the rod area; and
   viii. a flow restrictor in fluid communication with the third reduction volume;
(c) a pressure regulating means in fluid communication with the reducing means;
(d) means to initiate gas flow from the regulator means to a flow restricting means and to an exit port, and from the regulator means to a high flow demand means and a flow determined timing means;
(e) sensing means in fluid communication with the exit port to detect low pressure at the exit port and thereafter cause the high flow demand means and timing means to provide high flow for a predetermined time.

10. A gas flow control system of claim 9 in operative connection with a portable closed circuit breathing apparatus of the type comprising a pressurized source of breathable gas, a CO$_2$ absorption means, means for releasing the breathable gas to at least one breathing cavity of a user, and means for circulating the breathable gas between the user and the $CO_2$ absorption means.

11. A breathing device comprising a pressurized source of breathable gas, a $CO_2$ absorption means, means for releasing the breathable gas to at least one breathing cavity of a user, and means for circulating the breathable gas between the user and the $CO_2$ absorption means, and a gas flow control system of claim 9.

12. A gas flow control system of claim 9 wherein the pressure reducing means further comprises a porous metal restrictor positioned between the source of pressurized gas and at least one of the ball and seat assemblies.

* * * * *